United States Patent [19]

White et al.

[11] Patent Number: 5,039,346

[45] Date of Patent: Aug. 13, 1991

[54] FRUCTOSE SYRUPS AND SWEETENED BEVERAGES

[75] Inventors: Dorothy C. White, Argenta; Carl W. Niekamp, Forsyth, both of Ill.

[73] Assignee: A. E. Staley Manufacturing Company, Decatur, Ill.

[21] Appl. No.: 571,009

[22] Filed: Aug. 17, 1990

Related U.S. Application Data

[63] Continuation of Ser. No. 173,404, Mar. 25, 1988, abandoned.

[51] Int. Cl.$^5$ .................. C13F 1/14; C13F 1/04
[52] U.S. Cl. ............................ 127/63; 127/42; 127/58; 127/60; 127/30; 426/548; 426/804; 426/591; 426/658; 426/590; 426/285
[58] Field of Search ............... 127/63, 30, 58, 46.1, 127/60, 42, 63; 426/548, 804, 591, 653, 590, 285

[56] References Cited

U.S. PATENT DOCUMENTS

| | | | |
|---|---|---|---|
| 3,513,023 | 5/1970 | Kusch | 127/58 |
| 3,607,392 | 9/1971 | Lauer et al. | 127/58 |
| 3,684,573 | 8/1972 | Voight et al. | 127/30 |
| 3,883,365 | 5/1975 | Forsberg | 127/60 |
| 3,928,062 | 12/1975 | Yamauchi | 127/60 |
| 4,199,373 | 4/1980 | Dwivedi et al. | 127/60 |
| 4,263,052 | 4/1981 | Bichsel et al. | 127/46.1 |
| 4,293,577 | 10/1971 | Cillario | 426/244 |
| 4,294,624 | 10/1981 | Veltman | 127/62 |
| 4,303,684 | 12/1981 | Pitchon et al. | 426/312 |
| 4,350,711 | 9/1982 | Kahn et al. | 426/102 |
| 4,517,021 | 5/1985 | Schollmeier | 127/30 |
| 4,643,773 | 2/1987 | Day | 127/58 |
| 4,676,991 | 6/1987 | Batterman et al. | 127/58 |
| 4,895,601 | 1/1990 | Binder et al. | 127/58 |

OTHER PUBLICATIONS

B. H. Landis and K. E. Beery, "High-Fructose Corn Syrup", Developments in Soft Drinks Technology-3, pp. 85-120 (H. W. Houghton ed., Elsevier, 1984).
H. M. Pancoast and W. R. Junk, Handbook of Sugars, pp. 234, 246-248 (2nd ed. AVI Publ. Co. 1980).
F. E. Young et al., Journal of Physical Chemistry, vol. 56, pp. 738-739 and 1093-1096 (1952).
McGinnis, Sugar Technology Reviews, vol. 11, No. 1 (Elsevier, 1984) pp. 1, 2, 14, 21 & 76).
J. G. Woodruff et al., Beverages: Carbonated and Non-carbonated, pp. 85-107 (rev. ed., AVI Publ. Co., 1981).
Crystalline Fructose: A Breakthrough in Corn Sweetener Process Technology, Food Technology, vol. 41, No. 1, pp. 66, 67 & 72 (Jan. 1987).
S. A. Barker, "Pure Fructose Syrups", Process Biochemistry, pp. 20 & 25 (Dec. 1976).
J. A. Mathews et al., "The Stability of Levulose in Aqueous Solutions at Varying pH", Bureau of Standards Journal of Research, vol. 11, pp. 619-633, Nov. 1963.
B. Krol, "Stability of Fructose in an Acid Aqueous Solution", Gazeta Cukrownicza, vol. 88, pp. 10-12 (1980).
S. Ramchander et al., "Studies on the Mechanism of Color Formation in Glucose Syrups", Cereal Chemistry, vol. 52, pp. 166-173 (1975).
D. Herve, "Ion Exchange in the Sugar Industry-2", Process Biochemistry, pp. 31-34 (Jun. 1974).
R. E. Hebeda, "Syrups", Encyclopedia of Chemical Technology, vol. 22, pp. 499-522 (Kirk-Othmer, Ed., John Wiley & Sons 1983, 3d ed).
M. B. Jones, "Carbonated Beverages", Encyclopedia of Chemical Technology, vol. 4, pp. 710-725 (Kirk-Othmer, eds. John Wiley & Sons, 3d ed 1978).
G. Bollenback, "Special Sugars", Encyclopedia of Chemical Technology, vol. 21, pp. 944-948 (Kirk-Othmer eds. John Wiley & Sons, 3d ed 1983) pp. 944-946.
Y. D. Chu and K. A. Berglund, "Kinetics of Difructose Dianhydrides Formation under Fructose Crystallization Conditions", Starch/Staerke, vol. 42, No. 3, pp. 112-117 (1990).

*Primary Examiner*—John F. Niebling
*Assistant Examiner*—P. L. Hailey
*Attorney, Agent, or Firm*—Michael F. Campbell; J. Daniel Wood

[57] ABSTRACT

Methods of preparing and using sweetener syrups comprised of crystalline saccharides are provided. A crystalline saccharide composition comprised of crystalline fructose is dissolved in a potable liquid to form a concentrated syrup. Anhydrous crystalline fructose and/or crystalline fructose dihydrate are used to prepare the syrups. At least about 42% by weight of the crystalline saccharide composition is fructose, the remainder preferably being crystalline dextrose. The use of crystalline saccharides yield color stable syrups especially useful in clear and/or colorless beverages.

14 Claims, No Drawings

FRUCTOSE SYRUPS AND SWEETENED BEVERAGES

This application is a continuation of application Ser. No. 07/173,404, filed Mar. 25, 1988, now abandoned.

FIELD OF THE INVENTION

This invention relates to the manufacture, handling and use of fructose syrups and to beverages sweetened with fructose.

BACKGROUND OF THE INVENTION

The use of high fructose syrups as sweeteners for beverages is described by B. H. Landis and K. E. Beery, "High Fructose Corn Syrup", *Developments in Soft Drinks Technology*-3, pp. 85-120 (H. W. Houghton ed., Elsevier, 1984). High fructose corn syrup is described as isomerized corn syrup available at fructose concentrations of 42%, 55% and 90% fructose on a dry solids basis. Landis and Beery note at page 118 that high fructose corn syrups of the future may have fructose levels above 90% and that fructose is the most desirable monosaccharide used in soft drinks because it is the sweetest.

However, it is also known that high fructose corn syrups have a tendency to discolor over time. For example, H. M. Pancoast and W. R. Junk, *Handbook of Sugars*, pp. 234, 246-248 (2d ed. AVI Publ. Co. 1980), show that solutions having 55% or 90% concentrations of fructose exhibit greater color over time as compared with 42% fructose syrups stored at the same temperature. These greater color levels are undesirable, particularly if the syrup will be used to sweeten a clear and/or colorless beverage, such as a lemon line soft drink or a "wine cooler".

SUMMARY OF THE INVENTION

This invention relates to a method of preparing a fructose syrup sweetener comprising:

(a) dissolving an amount of a crystalline saccharide composition comprised of crystalline fructose sufficient to obtain a potable liquid comprised of water and from about 70% to about 80% dry saccharide solids, at least about 42% of said dry saccharide solids being fructose, and (b) storing said liquid for a period of least about one (1) day.

The crystalline fructose may be anhydrous crystalline fructose or fructose dihydrate. When fructose dihydrate is used, the water of hydration (and, optionally, adsorbed wash water) may be the potable liquid which dissolves the fructose.

In experiments with anhydrous crystalline fructose, it has been found that the color of the solution actually decreases over time of storage, at least initially. This result is especially surprising in view of the experience of the art with the color formation of high fructose corn syrups over time in storage.

This invention also relates to a method of preparing a sweetened beverage comprising:

(a) diluting an amount of a potable liquid comprised of water and from about 70% to about 80% dry saccharide solids, at least about 98% of said dry saccharide solids being fructose, said amount sufficient to form a solution having a sweetness equivalent to a sucrose solution of from about 1% to about 16% by weight sucrose; and (b) storing said solution for a period of at least about one (1) day.

The use of the sweetener syrup made in accordance with this invention to prepare a beverage by dilution thereof allows one to obtain a color stable beverage.

This invention also relates to a method of preparing a sweetened beverage comprising:

(a) dissolving an amount of a crystalline saccharide composition comprised of crystalline fructose in a potable liquid comprised of water, said amount sufficient to form a solution having a sweetness equivalent to a sucrose solution of from about 1% to about 16% by weight sucrose; and (b) storing said solution for a period of at least about one (1) day.

Color stable beverages can also be produced without the need for preparing a intermediate sweetener syrup.

DETAILED DESCRIPTION OF THE INVENTION

The method of this invention of preparing a fructose syrup sweetener comprises dissolving a crystalline saccharide composition comprised of crystalline fructose. This is to be distinguished from materials containing significant amounts of amorphous fructose or corn syrup by-products, e.g. the semi-crystalline fructose disclosed in U.S. Pat. No. 4,517,021 (Schollmeier). Examples of other crystalline saccharides include anhydrous dextrose, dextrose monohydrate, sucrose and the like. Preferred crystalline saccharide compositions consist of crystalline fructose or mixtures thereof with crystalline dextrose. The components of the crystalline saccharide composition can be dissolved separately or premixed before dissolution.

By crystalline fructose, it is meant a solid composition wherein substantially all of the fructose is contained in a crystal matrix. The fructose can be in the anhydrous crystalline form or the dihydrate crystalline form. Methods of preparing anhydrous crystalline fructose are described in U.S. Pat. Nos. 3,513,023 (Kusch), 3,883,365 (Forsberg), and 3,928,002 (Yamauchi). Methods of preparing crystalline fructose dihyrate are described by F. E. Young et al., Journal of Physical Chemistry, Vol. 56, pp. 738-739 and 1093-1096 (1952).

The fructose solution from which the crystalline fructose is obtained can be derived from many sources. It is typically a concentrated (by evaporation) fraction from the chromatographic separation of fructose and dextrose of an isomerized corn syrup, (see *Sugar Technology Reviews*, Vol. 11, No. 1 (Elsevier, 1984)). However, it can also be a fractionated and evaporated invert syrup or a hydrolyzed polyfructose such as inulin.

The dissolution of the crystalline saccharide composition comprised of crystalline fructose can be accomplished under a variety of conditions. The crystalline fructose can be added to a potable liquid or vice versa. In the case of fructose dihydrate, additional potable liquid may not be needed because melting of the crystalline form will free the water of hydration. The crystalline fructose used to prepare the syrup need not be isolated (i.e. dried and handled) following centrifugation and washing of the fructose massecuite.

Both anhydrous crystalline fructose and fructose dihydrate are readily soluble such that the time needed for complete dissolution of even relatively large particle size material will be relatively short. Typically however, the average particle size of the crystalline fructose will range from about 50 to about 500 microns.

The source of the water used to dissolve the crystalline saccharides is not critical so long as it is potable, i.e. fit for human consumption. The temperature of the water will typically be about ambient and generally should not exceed about 50° C., preferably not greater than about 40° C. The pH of the water is not critical, however, the syrup pH should range from slightly acidic (e.g. pH 3) to neutral (pH 7), typically 3.5–5.5, preferably 4.5–5.5.

The amount of crystalline fructose dissolved to prepare the syrup should be sufficient to provide a syrup having a solids level of from about 70% to about 80% by weight and a fructose content of at least 42% by weight on a dry solids basis, preferably at least 55% by weight, and most preferably at least 98% by weight. This will provide a concentrated, but stable syrup for storage and/or transport.

After formation of the syrup, the syrup can be stored until further processing or use is desired. By "store" and "storage", it is meant that the syrup is not chemically changed or consumed. Hence storage includes transport, handling, minor processing and the like. Examples of minor processing include the addition of additives such as artificial flavors, gums, colors, and water (e.g. those additives used to prepare a bottler's syrup for soft drinks).

It has been found that storage of a syrup derived by dissolving commercially available anhydrous crystalline fructose actually leads to an improvement in color, at least over a period of weeks following syrup formation and especially in the first week following syrup formation. In a sense, the storage of the syrup during this time period might also be characterized as an aging of the syrup which results in an aged syrup having improved (i.e. reduced) color.

The temperature at which the syrup is stored may vary widely, but will typically be at or near ambient temperature. Hence, it is not necessary to freeze the syrup to induce color stability. Slightly elevated temperatures (higher than ambient temperatures) are commonly employed with sweetener syrups to reduce viscosity and thereby expedite and/or facilitate transfer of the syrup, but highly elevated temperatures e.g. greater than 50° C., should generally be avoided to avoid heat-induced degradation of the syrup. General methods of handling nutritive sweeteners syrups are described by H. M. Pancoast et al., *Handbook of Sugars*, (2d ed., AVI Publ. Co., 1980) the disclosure of which is incorporated by reference. Handling in bulk is generally accomplished by pumping the syrup and/or gravity flow and shipment is by rail tank cars or tanker-trailers.

The syrup will find utility as a sweetener in a wide variety of applications. However, the syrup will have particular utility in those applications where color stability is particularly desirable. For example, beverages which are at least partially translucent or transparent and in which increases in color would be most noticeable will benefit from the use of the syrup as a sweetener. The preparation and handling of beverages is described in J. G. Woodruff et al., *Beverages: Carbonated and Noncarbonated* (rev. ed., AVI Publ. Co., 1981), the disclosure of which is incorporated herein.

EXAMPLES

SERIES I

Anhydrous crystalline fructose from two different commercial sources (Krystar TM available from A. E. Staley Mfg. Division of Staley Continental, Inc., and Fructofin TM available from American Xyrofin Corp.) were dissolved in deionized tap water and used in a storage study as outlined below. For comparative purposes, a high fructose corn syrup having approximately 90% (dsb) fructose (Superose TM 90 available from Cargill, Inc.) was evaluated as a side-by-side comparative.

Four different fructose syrups were evaluated:
1. Krystar crystalline fructose remelted to 77% DS.
2. 90% HFCS at 78% DS (Superose 90).
3. Fructofin crystalline fructose remelted to 71% DS.
4. Fructofin crystalline fructose remelted to 77% DS.

The crystalline fructose syrups were remelted slowly at room temperature to avoid undue stress. Separate samples of all four syrups were then incubated at room temperature (RT) or 100° F. in glass bottles. Syrups were routinely analyzed for color, acetaldehyde and hydroxymethyl-furfural (HMF) formation, fructose loss and microbial growth.

The color (in RBU, as defined by McGinnis, Sugar Technology Reviews, Vol. 11, p. 14 (1984)), HMF, fructose and difructose anhydrides (difructose) analyses are set forth in Tables 1–8, below.

TABLE 1

KRYSTAR TM at 77% DS @ RT

| Day | Color (RBU) | HMF (as is) | Fructose (%) | Difructose (%) |
|---|---|---|---|---|
| 0 | 9.9 | 0.54 | 99.84 | NR |
| 7 | 6.3 | 0.89 | 99.98 | NR |
| 14 | 6.3 | 1.42 | 99.81 | NR |
| 21 | 5.9 | 1.63 | 99.78 | 0.15 |
| 29 | 5.8 | 1.05 | 99.81 | 0.11 |
| 36 | 5.5 | 1.14 | 99.85 | 0.15 |
| 43 | 5.5 | 1.42 | 99.79 | 0.18 |
| 50 | 6.0 | 1.45 | 99.75 | 0.22 |
| 59 | 6.3 | 1.81 | 99.68 | 0.33 |
| 63 | 5.7 | 2.05 | 99.74 | 0.26 |
| 77 | 6.6 | 2.54 | 99.48 | 0.48 |

TABLE 2

KRYSTAR TM at 77% DS @ 100° F.

| Day | Color (RBU) | HMF (as is) | Fructose (%) | Difructose (%) |
|---|---|---|---|---|
| 0 | 9.9 | 0.54 | 99.84 | NR |
| 7 | 7.0 | 0.88 | 99.69 | 0.22 |
| 14 | 8.1 | 3.21 | 99.44 | 0.52 |
| 21 | 8.0 | 5.82 | 99.19 | 0.78 |
| 29 | 8.4 | 3.93 | 99.09 | 0.86 |
| 36 | 8.8 | 4.50 | 98.91 | 1.06 |
| 43 | 8.9 | 5.67 | 98.79 | 1.18 |
| 50 | 9.1 | 6.71 | 98.61 | 1.37 |
| 59 | 10.1 | 9.45 | 98.37 | 1.59 |
| 63 | 11.0 | 11.19 | 97.97 | 2.03 |
| 77 | 11.4 | 18.42 | 97.36 | 2.58 |

TABLE 3

SUPEROSE TM 90 @ RT

| Day | Color (RBU) | HMF (as is) | Fructose (%) | Difructose (%) |
|---|---|---|---|---|
| 0 | 3.9 | 12.73 | 90.92 | 1.61 |
| 7 | 10.8 | 12.65 | 90.84 | 1.32 |
| 14 | 11.9 | 14.77 | 90.40 | 1.72 |
| 21 | 11.7 | 15.33 | 90.48 | 1.68 |
| 29 | 12.2 | 14.81 | 90.55 | 0.85 |
| 36 | 11.7 | 15.81 | 90.50 | 2.05 |
| 43 | 12.9 | 16.40 | 90.68 | 1.47 |
| 59 | 13.8 | 16.75 | 90.29 | 2.41 |
| 84 | 14.3 | 17.00 | 89.34 | 2.09 |

TABLE 4

SUPEROSE ™ 90 @ 100° F.

| Day | Color (RBU) | HMF (as is) | Fructose (%) | Difructose (%) |
|---|---|---|---|---|
| 0 | 3.9 | 12.73 | 90.92 | 1.61 |
| 7 | 5.4 | 17.42 | 90.39 | 1.56 |
| 14 | 14.3 | 20.66 | 89.53 | 2.23 |
| 21 | 17.4 | 25.70 | 88.98 | 2.55 |
| 29 | 19.8 | 30.17 | 88.74 | 1.27 |
| 36 | 21.5 | 36.73 | 88.49 | 3.89 |
| 43 | 19.9 | 42.19 | 88.33 | 2.96 |
| 59 | 28.7 | 54.99 | 87.72 | 4.62 |
| 84 | 43.8 | 77.13 | 86.39 | 5.37 |

TABLE 5

FRUCTOFIN ™ at 71% DS @ RT

| Day | Color (RBU) | HMF (as is) | Fructose (%) | Difructose (%) |
|---|---|---|---|---|
| 0 | 28.5 | 8.96 | 99.95 | NR |
| 7 | 15.9 | 7.48 | 99.99 | NR |
| 14 | 17.7 | 9.72 | 99.54 | 0.44 |
| 21 | 16.6 | 9.61 | 99.81 | 0.19 |
| 29 | 14.6 | 9.02 | 99.79 | 0.16 |
| 36 | 13.0 | 9.69 | 99.63 | 0.36 |
| 43 | 11.9 | 9.97 | 99.58 | 0.36 |
| 59 | 11.2 | 9.81 | 99.40 | 0.58 |
| 84 | 10.7 | 9.47 | 88.96 | 1.02 |

TABLE 6

FRUCTOFIN ™ at 71% DS @ 100° F.

| Day | Color (RBU) | HMF (as is) | Fructose (%) | Difructose (%) |
|---|---|---|---|---|
| 0 | 28.5 | 8.96 | 99.95 | NR |
| 7 | 14.0 | 9.52 | 99.57 | 0.39 |
| 14 | 17.6 | 11.14 | 99.03 | 0.96 |
| 21 | 17.7 | 12.91 | 98.56 | 1.42 |
| 29 | 17.7 | 14.45 | 98.02 | 1.95 |
| 36 | 17.3 | 17.07 | 97.64 | 2.34 |
| 43 | 17.4 | 20.10 | 97.40 | 2.49 |
| 59 | 22.5 | 26.76 | 96.57 | 3.41 |
| 84 | 33.0 | 40.20 | 95.60 | 4.29 |

TABLE 7

FRUCTOFIN ™ at 77% DS @ RT

| Day | Color (RBU) | HMF (as is) | Fructose (%) | Difructose (%) |
|---|---|---|---|---|
| 0 | 28.0 | 9.38 | 99.73 | 0.21 |
| 7 | 18.2 | 9.18 | 99.95 | NR |
| 14 | 22.9 | 10.44 | 99.59 | 0.31 |
| 21 | 21.6 | 10.48 | 99.72 | 0.28 |
| 29 | 19.5 | 9.48 | 99.67 | 0.29 |
| 36 | 17.6 | 10.77 | 99.65 | 0.32 |
| 43 | 16.8 | 10.64 | 99.60 | 0.36 |
| 59 | 15.3 | 11.02 | 99.51 | 0.47 |
| 84 | 13.5 | 9.92 | 99.13 | 0.86 |

TABLE 8

FRUCTOFIN ™ at 77% DS @ 100° F.

| Day | Color (RBU) | HMF (as is) | Fructose (%) | Difructose (%) |
|---|---|---|---|---|
| 0 | 28.0 | 9.38 | 99.73 | 0.21 |
| 7 | 18.9 | 10.07 | 99.67 | 0.28 |
| 14 | 22.6 | 11.95 | 99.19 | 0.78 |
| 21 | 22.1 | 13.49 | 98.91 | 1.09 |
| 29 | 21.8 | 14.71 | 98.38 | 1.58 |
| 36 | 20.4 | 18.64 | 97.97 | 2.02 |
| 43 | 20.2 | 21.34 | 97.66 | 2.26 |
| 59 | 22.2 | 27.99 | 96.46 | 3.54 |
| 84 | 29.5 | 40.45 | 94.99 | 4.88 |

The data shown in Tables 1–8 and the acetaldehyde and microbial stability data can be summarized as follows.

COLOR FORMATION—Remelted crystalline fructose syrup exhibited unusual color properties. In every case, a 30–50% decrease in color was observed when going from crystalline to syrup form and no color formation was observed after a three-month incubation at room temperature. Even upon storage at 100° F., the color of the remelted crystalline fructose syrup remained stable for two months. The color of the 90% HFCS, however, increased significantly within the first week of storage before levelling out. The 77% DS crystalline fructose syrups are significantly more color stable than the 90% HFCS, with the Krystar remelt having the best starting and finish color of the remelt syrups tested.

HMF PROFILE—There was no significant HMF formation in any of the syrups when stored at room temperature over the three-month storage period. At 100° F., however, the rate of HMF formed was approximately twice as great in the 90% HFCS than the remelts. In other words, at room temperature, the remelts are as stable as the 90% HFCS with respect to HMF formation. But at 100° F., the remelted crystalline fructose syrups are significantly more storage stable than the 90% HFCS with the Krystar syrup having the least starting and finish HMF of all.

FRUCTOSE PROFILE—The fructose profiles for all the syrups are similar. At room temperature, the differences in fructose loss are slight with the Krystar remelt losing only 0.5% and the 90% HFCS losing the most at 1.7%. At 100° F., the differences in fructose loss are significant, with the Krystar remelt again losing the least at 2.6% and the 90% HFCS again losing the most at 5.0%. In all cases, the formation of difructose was the result of the fructose loss.

ACETALDEHYDE—There were no significant differences in acetaldehyde formation amongst the samples.

MICROBIAL COUNT—As with the acetaldehyde formation, there were no significant differences in microbial count in any of the syrups with time.

SERIES II

A second series of syrups were prepared from crystalline fructose (Krystar ™ available from A. E. Staley Mfg. Division of Staley Continental, Inc.) at 77% DS as in the foregoing series, except for storage in polyolefin rather than glass bottle and that the pH for three of the samples was adjusted to 3.6, 4.0 and 5.0 from 4.5. For comparative purposes, commercially available high fructose corn syrups at 90% (dsb) and 55% (dsb) fructose (Superose ™ 90 available from Cargill, Inc. and Isosweet ™ 5500 available from A. E. Staley Mfg. Division of Staley Continental, Inc., respectively) were evaluated as a side-by-side comparative. The results are shown below.

RBU Color of Krystar at 77% DS

| DAY | pH 3.6 RT | pH 3.6 100° F. | pH 4.0 RT | pH 4.0 100° F. | pH 4.5 RT | pH 4.5 100° F. | pH 5.0 RT | pH 5.0 100° F. |
|---|---|---|---|---|---|---|---|---|
| 0 | 7 | 7 | 7 | 7 | 7.1 | 7.1 | 7.9 | 7.9 |
| 1 | 6 | 6.6 | 5.5 | 6.3 | 6.8 | 6.2 | 7 | 6.6 |
| 3 | 6.2 | 6.5 | 5.5 | 6.2 | 6.3 | 6.5 | 7.1 | 7.3 |
| 5 | 6.8 | 10.2 | 5.3 | 8.4 | 5.7 | 11.4 | 7.5 | 12.7 |
| 8 | 6.8 | 7.3 | 6 | 7 | 5.8 | 6.8 | 7.1 | 8.1 |

-continued

| | | | | | | | |
|---|---|---|---|---|---|---|---|
| 14 | 5.7 | 10.4 | 5.8 | 8.8 | 5.8 | 7.8 | 6.5 | 8.9 |
| 28 | 6.6 | 19.2 | 6.5 | 17.2 | 7 | 10.5 | 6.2 | 11.5 |
| 35 | 7.3 | 26.4 | 7.3 | 24.1 | 6.8 | 13.5 | 6.6 | 14.5 |
| 56 | 10.9 | 51.9 | 9.3 | 47.7 | 8.8 | 27.5 | 7.6 | 27.7 |

RBU Color of HFCS

| DAY | 90% HFCS | | 55% HFCS | |
|---|---|---|---|---|
| | RT | 100° F. | RT | 100° F. |
| 0 | 22.8 | 22.8 | 7.5 | 7.5 |
| 1 | 29 | 20.5 | 7.5 | 8.1 |
| 3 | 24.2 | 27.2 | 8.8 | 9.9 |
| 5 | 25.7 | 33.2 | 10.1 | 15.9 |
| 8 | 24.9 | 28 | 8.4 | 13.7 |
| 14 | 26.2 | 42.7 | 9.1 | — |
| 28 | 26.9 | 53.4 | 8.6 | 25.7 |
| 35 | 28 | 62.1 | 10.9 | 29.3 |
| 56 | 32.1 | 90.8 | 12.7 | 42.5 |

The data shows less color development at day 56 at pH 4.5 and 5.0 than at pH 3.6 and 4.0. The data at day 5 are believed to be erroneous due to a slight variation in procedure.

What is claimed is:

1. A method of preparing a fructose syrup sweetener comprising:
   (a) dissolving an amount of a crystalline saccharide composition comprised of crystalline fructose sufficient to obtain a potable liquid comprised of water and from about 70% by weight to about 80% by weight dry saccharide solids, at least about 98% by weight of said dry saccharide solids being fructose, and
   (b) storing said liquid for a period of at least one day at a pH of from 3.5 to 5.5.

2. A method of claim 1 wherein said crystalline saccharide composition consists of a member selected from the group consisting of anhydrous crystalline fructose, fructose dihydrate, and mixtures thereof.

3. A method of claim 1 wherein said crystalline saccharide composition consists of anhydrous crystalline fructose.

4. A method of claim 3 wherein said dissolving comprises mixing anhydrous crystalline fructose with potable water.

5. A method of claim 1 wherein said crystalline saccharide composition consists of fructose dihydrate.

6. A method of claim 5 wherein said dissolving comprises melting said fructose dihydrate.

7. A method of claim 1 wherein said storing comprises transporting said syrup.

8. A method of claim 7 wherein said syrup is maintained at a temperature greater than ambient during said transport.

9. A method of claim 1 wherein said liquid is maintained at a temperature above about 0° C. during said storage.

10. A method of claim 1 further comprising crystallizing fructose from an aqueous solution of fructose and dextrose to produce crystalline fructose and mother liquor and separating said crystalline fructose from said mother liquor prior to said dissolving of said crystalline fructose.

11. A method of claim 1 wherein said period is at least about one week.

12. A method of preparing a fructose syrup sweetener comprising dissolving an amount of crystalline fructose dihydrate sufficient to obtain a liquid comprised of water and from about 70% by weight to about 80% by weight dry saccharide solids, at least about 98% by weight of said dry saccharide solids being fructose and storing said liquid for at least about one day at a pH of from 3.5 to 5.5.

13. A method of claim 12 wherein said dissolving comprises melting said crystalline fructose dihydrate.

14. A method of claim 13 further comprising crystallizing fructose from an aqueous solution of fructose to produce crystalline fructose dihydrate and mother liquor, separating said crystalline fructose dihydrate from said mother liquor, and washing said separated crystalline fructose dihydrate to produce wet crystalline fructose dihydrate.

* * * * *